United States Patent
Ohtsuka et al.

(10) Patent No.: US 11,807,475 B2
(45) Date of Patent: Nov. 7, 2023

(54) LOADING SUPPORT SYSTEM

(71) Applicant: TOYOTA JIDOSHA KABUSHIKI KAISHA, Toyota (JP)

(72) Inventors: Kohei Ohtsuka, Hino (JP); Atsushi Sajiki, Okazaki (JP); Yukio Umemura, Fuchu (JP); Takashi Nanbu, Hino (JP); Hiroki Tabata, Hino (JP); Hiroki Hagiwara, Hino (JP); Takeshi Saotome, Hino (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 358 days.

(21) Appl. No.: 16/842,128

(22) Filed: Apr. 7, 2020

(65) Prior Publication Data
US 2020/0324984 A1 Oct. 15, 2020

(30) Foreign Application Priority Data
Apr. 12, 2019 (JP) ................................ 2019-076135

(51) Int. Cl.
*B65G 67/04* (2006.01)
*G05B 15/02* (2006.01)
*G01C 21/34* (2006.01)

(52) U.S. Cl.
CPC ............. *B65G 67/04* (2013.01); *G05B 15/02* (2013.01); *G01C 21/3407* (2013.01)

(58) Field of Classification Search
CPC .... B65G 67/04; G05B 15/02; G01C 21/3407; G06Q 10/08; G06Q 10/04; G06Q 10/083
See application file for complete search history.

(56) References Cited

FOREIGN PATENT DOCUMENTS

| EP | 3 093 812 A1 | | 11/2016 | |
|----|----|----|----|----|
| JP | H11-175595 A | | 7/1999 | |
| JP | 2001-294307 A | | 10/2001 | |
| JP | 2005-112628 A | | 4/2005 | |
| JP | 2008-143663 A | | 6/2008 | |
| KR | 20160134977 | * | 11/2016 | ............ G06Q 10/08 |
| WO | WO-2017191695 A1 | * | 11/2017 | ............... B60P 3/00 |
| WO | 2018/100631 A1 | | 6/2018 | |

* cited by examiner

*Primary Examiner* — Kim T Nguyen
(74) *Attorney, Agent, or Firm* — Sughrue Mion, PLLC

(57) ABSTRACT

There is provided a loading support system including a container selection unit configured to select a container, which is suitable for a shape of a load to be loaded on a cargo bed of a collection and delivery vehicle, from a plurality of standardized containers having different shapes, and a loading location determination unit configured to determine a loading location of the container, which is selected by the container selection unit, in the cargo bed.

11 Claims, 5 Drawing Sheets

LOADING SUPPORT SYSTEM

TECHNICAL FIELD

An aspect of the present disclosure relates to a loading support system that supports loading on a collection and delivery vehicle.

CROSS-REFERENCE TO RELATED APPLICATION

This application claims the benefit of priority from Japanese Patent Application No. 2019-076135, filed Apr. 12, 2019, the entire contents of which are incorporated herein by reference.

BACKGROUND

In Japanese Unexamined Patent Publication No. H11-175595 discloses a vehicle mounting method for classifying packages into shape groups in advance according to similar shapes and sizes, determining an upper limit of a loading amount in advance with respect to a loading order and a vehicle for each shape group, and sequentially loading the packages on the vehicle.

SUMMARY

In the vehicle mounting method described in Japanese Unexamined Patent Publication No. H11-175595, the packages are classified into the shape groups in advance according to the similar shapes and sizes. However, the shapes and sizes of a plurality of the packages belonging to one group are different, and thus a useless space is easily generated in an assembly of the packages loaded on the vehicle. Therefore, there is room for improvement from a viewpoint of transportation efficiency.

An aspect of the present disclosure has an object to provide a loading support system in which it is possible to improve transportation efficiency.

According to an aspect of the present disclosure, there is provided a loading support system including a container selection unit configured to select a container, which is suitable for a shape of a load to be loaded on a cargo bed of a collection and delivery vehicle, from a plurality of standardized containers having different shapes, and a loading location determination unit configured to determine a loading location of the container, which is selected by the container selection unit, in the cargo bed.

In the loading support system, the container, which is suitable for the shape of the load to be loaded on the cargo bed, is selected from the plurality of standardized containers having different shapes, and the loading location of the container in the cargo bed is determined. Therefore, for example, when the containers are loaded in the determined loading locations, it is possible to densely arrange the containers. Accordingly, it is possible to improve transportation efficiency.

The loading support system may further include an empty space information acquisition unit configured to acquire empty space information which is information about an empty space of the cargo bed, and the loading location determination unit may determine the loading location of the container, which is selected by the container selection unit, in the cargo bed from the empty space indicated by the empty space information. When the container is loaded on the cargo bed, there is a case where the load is already loaded on the cargo bed. Here, when the empty space information, which is the information about the empty space of the cargo bed, is acquired and the loading location of the container selected by the container selection unit is determined from the empty space indicated by the empty space information, it is possible to appropriately perform loading.

The loading support system may further include a collection and delivery route information acquisition unit configured to acquire collection and delivery route information which is information about a collection and delivery route of the collection and delivery vehicle, and the loading location determination unit may determine the loading location of the container, which is selected by the container selection unit, in the collection and delivery vehicle based on the collection and delivery route information. When the collection and delivery route information which is the information about the collection and delivery route of the collection and delivery vehicle is acquired and the loading location of the container selected by the container selection unit is determined based on the collection and delivery route information, it is possible to improve loading and unloading workability and efficiency. For example, in the collection and delivery route, the closer the collection location, the loading location becomes an inner side or a lower side, and the farther the collection location, the loading location becomes a nearer side or an upper side. On the other hand, in the collection and delivery route, the closer the delivery destination, the loading location becomes the nearer side or the upper side, the farther the delivery destination, the loading location becomes the inner side or the lower side.

The loading support system may further include a collection place information acquisition unit configured to acquire collection place information, which is information about a collection location of the load, when the loading location of the container selected by the container selection unit is determined based on the collection and delivery route information. In this case, when the collection place information, which is the information about the collection location of the load, is acquired, it is possible to determine the loading location in a location with higher loading workability and efficiency.

The loading support system may further include a delivery destination information acquisition unit configured to acquire delivery destination information, which is information about a delivery destination of the load, when the loading location of the container selected by the container selection unit is determined based on the collection and delivery route information. In this case, when the delivery destination information, which is the information about the delivery destination of the load, is acquired, it is possible to determine the loading location in a location with higher unloading workability and efficiency.

The plurality of standardized containers may be rectangular parallelepiped containers each having a length, a width, or a height that is an integral multiple with respect to a smallest container. When the plurality of standardized containers are the rectangular parallelepiped containers each having the length, the width, or the height that is the integral multiple with respect to the smallest container, it is possible to perform further efficient loading.

The loading support system may further include an output unit configured to output the loading location determined by the loading location determination unit. When the loading location determined by the loading location determination unit is output, it is possible to improve workability of a loading worker.

The output unit may display an image schematically representing the cargo bed by superimposing an image indicating the loading location determined by the loading location determination unit. When the output unit displays the image schematically representing the cargo bed by superimposing the image indicating the loading location determined by the loading location determination unit, it is possible to further improve workability of the loading worker.

According to the aspect of the present disclosure, it is possible to improve transportation efficiency.

DETAILED DESCRIPTION

Figure 1:
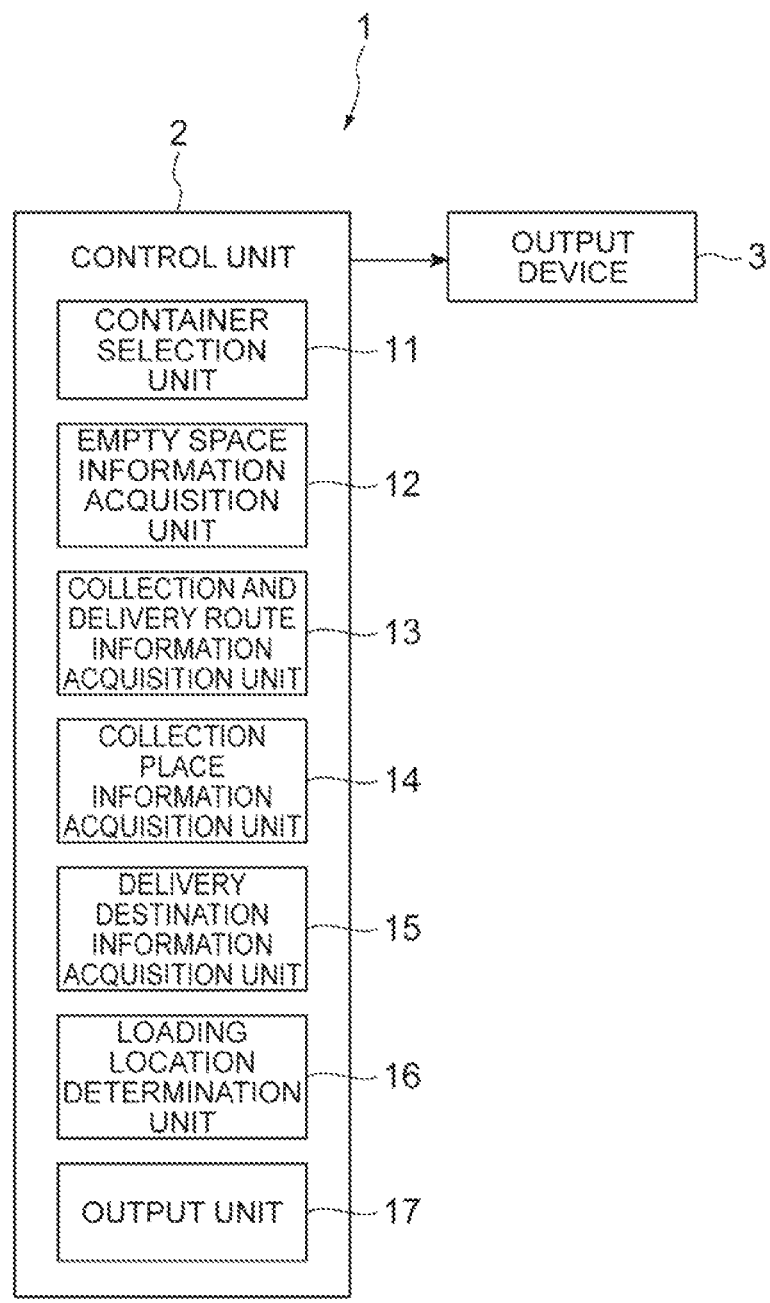
FIG. 1 is a block diagram illustrating a functional configuration of a loading support system according to an embodiment.

Hereinafter, an embodiment of the present disclosure will be described in detail with reference to the accompanying drawings. Note that, in description below, the same or corresponding elements will be denoted by the same reference numerals, and the description thereof will not be repeated.

Figure 2:
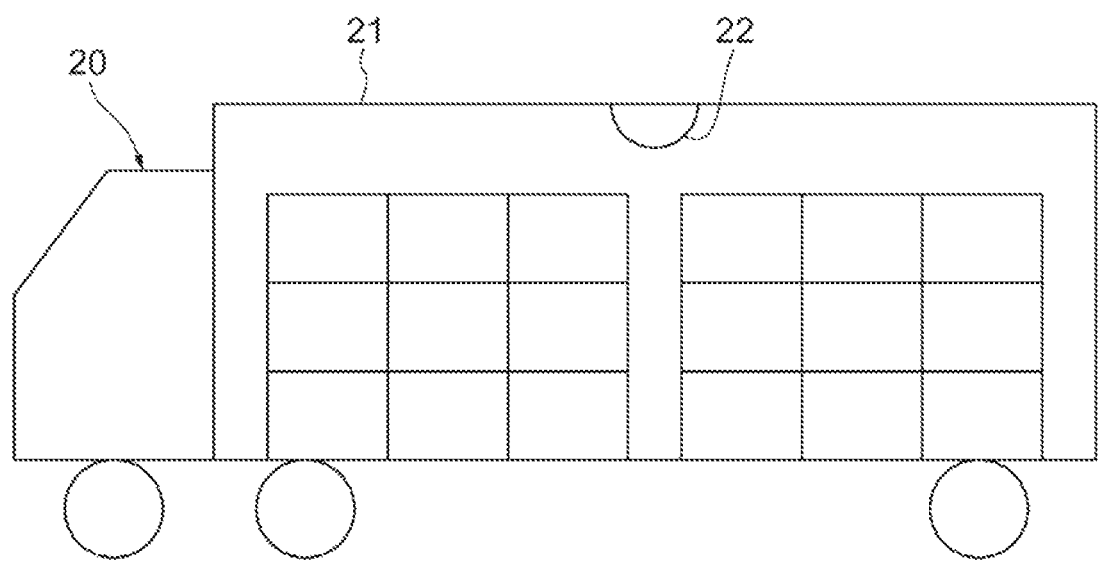
FIG. 2 is a schematic diagram illustrating a collection and delivery vehicle.

The loading support system 1 illustrated in FIG. 1 is a system for supporting loading on a cargo bed 21 of a collection and delivery vehicle 20 illustrated in FIG. 2. The collection and delivery vehicle 20 may be any vehicle as long as a vehicle which includes the cargo bed 21 on which a load can be loaded, and can include, for example, a commercial vehicle such as a truck, a wagon vehicle, or the like. The loading support system 1 includes a control unit 2 and an output device 3.

The control unit 2 is an electronic control unit having a Central Processing Unit (CPU), a Read Only Memory (ROM), a Random Access Memory (RAM), and the like. In the control unit 2, various controls are executed in such a way that a program stored in the ROM is loaded to the RAM and the CPU executes the program. The control unit 2 may include a plurality of the electronic control units. The control unit 2 may be provided in a collection and delivery base-station such as a cross dock, may be provided other than the collection and delivery base station, or may be partially provided in a location other than the collection and delivery base station. The control unit 2 may include, for example, a server or the like.

The control unit 2 functionally includes a container selection unit 11, an empty space information acquisition unit 12, a collection and delivery route information acquisition unit 13, a collection place information acquisition unit 14, a delivery destination information acquisition unit 15, a loading location determination unit 16, and an output unit 17.

The container selection unit 11 selects a container suitable for a shape of the load to be loaded on the cargo bed 21 of the collection and delivery vehicle 20 from a plurality of standardized containers having different shapes.

It is possible to determine the shape of the load to be loaded on the cargo bed 21 by, for example, manual input performed by a shipper or a collection and delivery agent, image processing of a captured image of the load by an imaging device such as a camera, sensing of the load by various sensors, and the like. The collection and delivery agent includes, for example, a driver of the collection and delivery vehicle 20, a passenger of the collection and delivery vehicle 20, a worker of the collection and delivery base station, such as the cross dock, a manager who remotely manages collection and delivery, and the like.

The container selected by the container selection unit 11 is a container for inserting the load to be loaded on the cargo bed 21, and the standardized container is a container having a predetermined shape. The container may be, for example, a normal corrugated box, a container equipped with a smart key for ensuring security, or a foldable container.

Although a type of the container selected by the container selection unit 11 is not particularly limited, 2 to 6 types are preferable and 3 to 5 types are more preferable from a viewpoint of efficient loading.

Figure 3A:
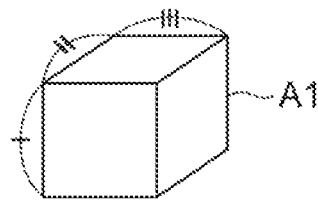
FIGS. 3A, 3B and 3C are perspective views illustrating examples of standardized containers.
Figure 3B:
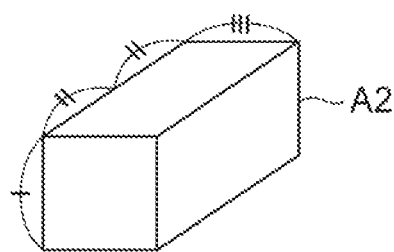
Figure 3C:
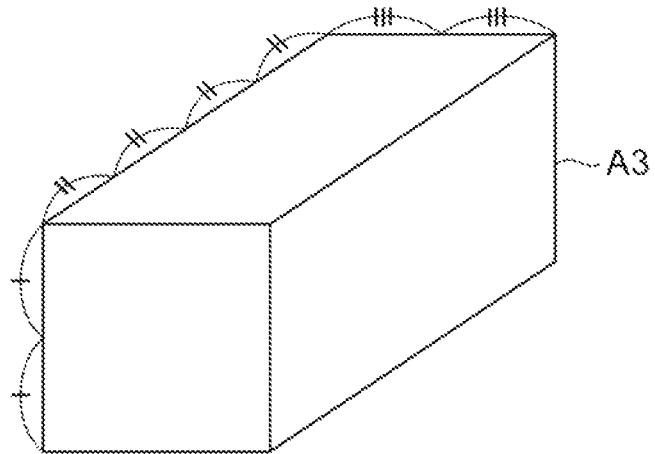

Although the shape of the container selected by the container selection unit 11 is not particularly limited, it is possible to set the shape of the container to, for example, a rectangular parallelepiped container having a length, a width, or a height that is an integral multiple with respect to a smallest container, as illustrated in FIGS. 3A to 3C.

Figure 4:
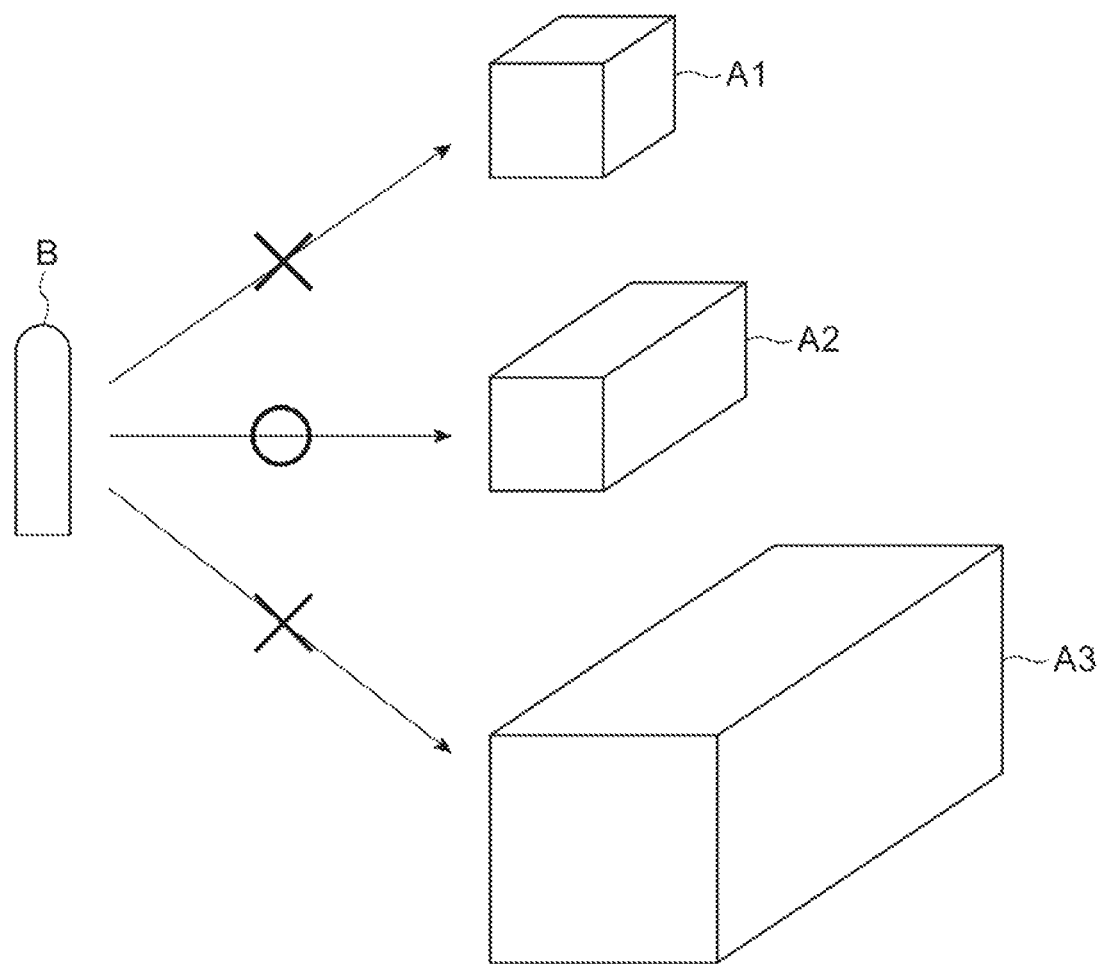
FIG. 4 is a diagram illustrating selection, performed by a container selection unit, of a container suitable for a shape of a load to be loaded on a cargo bed.

In FIGS. 3A to 3C, a container illustrated in FIG. 3A is the smallest container A1. Further, a container A2 illustrated in FIG. 3B has a dimension having two-times longer length, one-time longer width, and one-time longer height with respect to the container A1 illustrated in FIG. 3A. The container A3 illustrated in FIG. 3B has a dimension having four-times longer length, two-times longer width, and two-times longer height with respect to the container A1 illustrated in FIG. 3A. Further, as illustrated in FIG. 4, the container selection unit 11 selects a container suitable for a shape of a load B to be loaded on the cargo bed 21 from the containers A1 to A3. FIG. 4 illustrates a case where the container A2 is selected as the container suitable for the shape of the load B to be loaded on the cargo bed 21.

The empty space information acquisition unit 12 acquires empty space information which is information about an empty space of the cargo bed 21 of the collection and delivery vehicle 20. The empty space information includes, for example, a location, a shape, a size, and the like of the empty space. It is possible to acquire the empty space information using, for example, an imaging device 22, such as a camera, that is installed on the cargo bed 21 and captures an image of an interior of the cargo bed 21. It is possible to acquire the empty space information using the imaging device 22 in such a way that, for example, the collection and delivery agent monitors an image captured by the imaging device 22 and manually inputs the empty space information, for example, in a network terminal, such as a personal computer or a smartphone, connected to the control unit 2 through a network, or automatically or semi-automatically inputs the empty space information by performing image processing on the captured image of the imaging device 22.

The collection and delivery route information acquisition unit 13 acquires collection and delivery route information that is information about a route through which the collection and delivery vehicle 20 performs collection and delivery. The route, through which the collection and delivery vehicle 20 performs collection and delivery, includes a collection route for collecting the load and a delivery route for delivering the collected load. It is possible to acquire the collection and delivery route information in such a way that the collection and delivery agent manually inputs the collection and delivery route information, for example, in the network terminal, such as the personal computer or the smartphone, connected to the control unit 2 through the network, or reads previously registered collection and delivery route information.

The collection place information acquisition unit 14 acquires collection place information that is information about a collection location of the load. The collection location of the load is a location collecting and loading the load to the collection and delivery vehicle 20. The collection location of the load includes, for example, an address of the shipper, a collection and delivery base station corresponding to the address of the shipper, and the like. The collection and delivery base station corresponding to the address of the shipper includes, for example, a collection and delivery base station closest to the address of the shipper such as a collection and delivery base station which has jurisdiction over the address of the shipper. It is possible to acquire the collection place information in such a way that the shipper or the collection and delivery agent manually inputs the collection place information, for example, in the network terminal, such as the personal computer or the smartphone, connected to the control unit 2 through the network, and automatically or semi-automatically inputs the collection place information by imaging a route slip by the imaging device and performing the image processing on an image captured by the imaging device. Note that, when the collection location of the load is the collection and delivery base station or the like instead of the address of the shipper and when the address of the shipper is input to the above-described network terminal, the collection place information acquisition unit 14 may automatically select the collection and delivery base station or the like corresponding to the address as the collection place information.

The delivery destination information acquisition unit 15 acquires the delivery destination information that is information about the delivery destination of the load. The delivery destination of the load is a location where the load is unloaded from the collection and delivery vehicle 20. The delivery destination of the load includes, for example, an address of the transmission destination of the load, a collection and delivery base station corresponding to the address of the transmission destination of the load, and the like. The collection and delivery base station corresponding to the address of the transmission destination of the load includes, for example, a collection and delivery base station which has jurisdiction over the address of the transmission destination of the load, a collection and delivery base station closest to the address of the transmission destination of the load, and the like. It is possible to acquire the delivery destination information in such a way that the shipper or the collection and delivery agent manually inputs the delivery destination information, for example, from the network terminal, such as the personal computer or the smartphone, connected to the control unit 2 through the network, or automatically or semi-automatically inputs the delivery destination information by imaging the route slip by the imaging device and performing the image processing on an image captured by the imaging device. Note that, when the delivery destination of the load is not the address of the transmission destination of the load but the collection and delivery base station or the like, and the address of the transmission destination of the load is input to the above-described network terminal, the delivery destination information acquisition unit 15 may automatically select the collection and delivery base station or the like corresponding to the address as the delivery destination information.

The loading location determination unit 16 determines a loading location of the container, which is selected by the container selection unit 11, in the cargo bed 21. The loading location is a location in the cargo bed 21 where the container, to which the load is inserted, is loaded. The loading location includes, for example, a location, a shape, a size, and the like of the cargo bed 21. The loading location may be a three-dimensional location, a horizontal location as a two-dimensional location, a vertical location as the two-dimensional location, or a combination thereof.

The loading location determination unit 16 determines the loading location so that storage efficiency of the cargo bed 21 is increased. For example, high storage efficiency of the cargo bed 21 indicates that a useless space between adjacent containers is less. It is possible to use various known algorithms as a loading location determination algorithm so that the storage efficiency of the cargo bed 21 is increased. Note that, the loading location determination unit 16 may include a function capable of changing the determined loading location.

Figure 5:
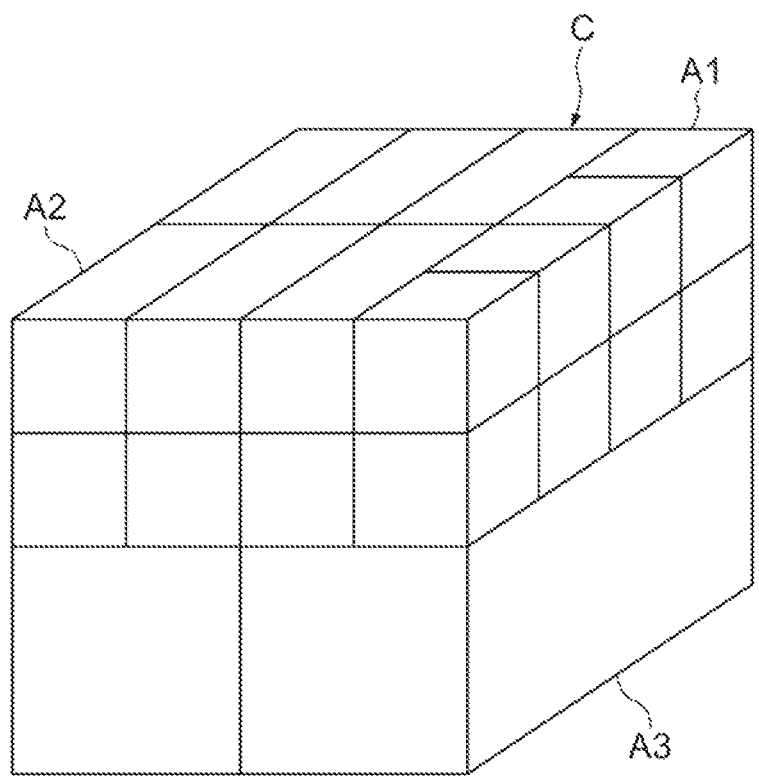
FIG. 5 is a perspective view illustrating an example of an assembly of containers loaded on the cargo bed.

However, although an assembly may have any shape when the loading on the cargo bed 21 is completed, an assembly of rectangular parallelepipeds as illustrated in FIG. 5 is preferable in consideration of transshipment in the collection and delivery base station and the like. The assembly is an assembly of a plurality of containers (loads) loaded on the cargo bed 21. In the collection and delivery base station and the like, the transshipment is performed using a forklift, a transport conveyor, transport rollers and the like. When the containers loaded on the cargo bed 21 become an assembly of the rectangular parallelepipeds, it is possible to perform the transshipment without load collapse, that is, efficiently.

In particular, when a plurality of standardized containers selected by the container selection unit 11 are rectangular parallelepiped containers which each have a relation in which lengths, widths, or heights that are integral multiples with respect to the smallest container, it is possible to easily form the assembly into the rectangular parallelepiped. FIG. 5 illustrates an example ix which the loading locations of the containers A1, A2, and A3 are determined so that an assembly C becomes a rectangular parallelepiped.

When the empty space information acquisition unit 12 acquires the empty space information, the loading location determination unit 16 may determine the loading location of the container, which is selected by the container selection unit 11, in the cargo bed 21 from the empty space indicated by the empty space information.

When the collection and delivery route information acquisition unit 13 acquires the collection and delivery route information, the loading location determination unit 16 may determine the loading location of the container, which is selected by the container selection unit 11, in the cargo bed 21 based on the collection and delivery route information. For example, in the collection route, the closer the collection location, the loading location becomes an inner side or a lower side, and the farther the collection location, the loading location becomes a nearer side or an upper side. On the other hand, in the delivery route, the closer the delivery destination, the loading location becomes the nearer side or the upper side, the farther the delivery destination, the loading location becomes the inner side or the lower side. For example, the collection place information acquired by the collection place information acquisition unit 14 and the delivery destination information acquired by the delivery destination information acquisition unit 15 may be used for the collection location and the loading location.

The output unit 17 outputs the loading location of the container, which is determined by the loading location determination unit 16, in the cargo bed 21 to the output device 3. An output form of the loading location includes an output by display, an output by voice, an output by printing on a medium such as paper, and the like. When the loading location is output by the display, the output unit 17 may perform display, for example, by causing the output device 3 to superimpose a three-dimensional or two-dimensional image schematically illustrating the cargo bed 21, on an image indicating the loading location of the container determined by the loading location determination unit 16. In addition, when the loading location is output by voice, for example, the output unit 17 may cause the output device 3 to output a voice indicating the three-dimensional location or the two-dimensional location of the loading location.

The output device 3 outputs the loading location, the output of which is directed from the output unit 17. The output device 3 includes, for example, an image display device such as a display, an audio output device such as a speaker, and a printing device such as a printer.

Subsequently, a flow of loading support performed in the loading support system 1 will be described.

First, the container selection unit 11 selects the container suitable for the shape of the load to be loaded on the cargo bed 21 of the collection and delivery vehicle 20 from the plurality of standardized containers having different shapes. In addition, the empty space information acquisition unit 12 acquires empty space information. In addition, the collection and delivery route information acquisition unit 13, the collection place information acquisition unit 14, and the delivery destination information acquisition unit 15 acquire the collection and delivery route information, the collection place information, and the delivery destination information, respectively.

Subsequently, the loading location determination unit 16 determines the loading location of the container, which is selected by the container selection unit 11, in the cargo bed 21. Subsequently, the output unit 17 outputs the loading location determined by the loading location determination unit 16 to the output device 3.

As described above, in the present embodiment, the container, which is suitable for the shape of the load to be loaded in the cargo bed 21, is selected from the plurality of standardized containers having different shapes, and the loading location of the container in the cargo bed 21 is determined. Therefore, for example, when the containers are loaded in the determined loading locations, it is possible to densely arrange the containers. Accordingly, it is possible to improve transportation efficiency.

By the way, when the container is loaded on the cargo bed 21, there is a case where the load is already loaded on the cargo bed 21. Here, when the empty space information, which is the information about the empty space of the cargo bed 21, is acquired and the loading location of the container selected by the container selection unit 11 is determined from the empty space indicated by the empty space information, it is possible to appropriately perform loading.

In addition, when the collection and delivery route information which is the information about the collection and delivery route of the collection and delivery vehicle is acquired and the loading location of the container selected by the container selection unit 11 is determined based on the collection and delivery route information, it is possible to improve loading and unloading workability and efficiency. In this case, when the collection place information, which is the information about the collection location of the load, is acquired, it is possible to determine the loading location in a location with higher loading workability and efficiency. In addition, when the delivery destination information, which is the information about the delivery destination of the load, is acquired, it is possible to determine the loading location in a location with higher unloading workability and efficiency.

In addition, when the plurality of standardized containers are rectangular parallelepiped containers which each have lengths, widths, or heights that are integral multiples with respect to the smallest container, it is possible to perform further efficient loading.

In addition, when the loading location determined by the loading location determination unit 16 is output, it is possible to improve workability of a loading worker.

In addition, when the output unit 17 displays an image schematically representing the cargo bed 21 on the output device 3 by superimposing the image indicating the loading location determined by the loading location determination unit 16, it is possible to further improve workability of the loading worker.

Hereinabove, although the embodiment of the present disclosure has been described, the present disclosure is not limited to the embodiment and may be modified or applied to another embodiment in a scope without changing the gist disclosed in each claim.

What is claimed is:

1. A loading support system comprising:
   a memory that stores an executable program; and
   a processor that executes the executable program,
   wherein the processor is programmed to:
   select a container, which is suitable for a shape of a load to be loaded on a cargo bed of a collection and delivery vehicle, from a plurality of standardized containers having different shapes; and
   after the container is selected and while the load is inside the container, determine a loading location of the container in the cargo bed such that an outer shape of an assembly of the plurality of standardized containers that form the load arranged on the cargo bed in at least one of a vehicle width direction of the collection and delivery vehicle, an up-down direction of the collection and delivery vehicle, and a front-rear direction of the collection and delivery vehicle, is a rectangular parallelepiped.

2. The loading support system according to claim 1, wherein the processor is further programmed to:
   acquire empty space information which is information about an empty space of the cargo bed,
   determine the loading location of the container, which was selected, in the cargo bed from the empty space indicated by the empty space information.

3. The loading support system according to claim 1, wherein the processor is further programmed to:
   acquire collection and delivery route information which is information about a collection and delivery route of the collection and delivery vehicle,
   determine the loading location of the container, which was selected, in the collection and delivery vehicle based on the collection and delivery route information.

4. The loading support system according to claim 3, wherein the processor is further programmed to:
   acquire collection place information which is information about a collection location of the load.

5. The loading support system according to claim 3, wherein the processor is further programmed to:
acquire delivery destination information which is information about a delivery destination of the load.

6. The loading support system according to claim 1, wherein the plurality of standardized containers are rectangular parallelepiped containers each having a length, a width, or a height that is an integral multiple with respect to a smallest container from amongst the plurality of standardized containers.

7. The loading support system according to claim 1, further comprising an output device,
wherein the processor is further programmed to:
output the loading location to the output device.

8. The loading support system according to claim 7, wherein the processor is further programmed to display, on the output device, an image schematically representing the cargo bed by superimposing an image indicating the loading location.

9. The loading support system according to claim 1, wherein the processor is further programmed to determine the loading location of a first container on the cargo bed to be a location farther from a loading port of the container on the cargo bed than the loading location of a second container on the cargo bed when a collection location where the first container is loaded on the cargo bed is closer to a current location of the collection and delivery vehicle than the collection location where the second container is loaded on the cargo bed.

10. A loading support system comprising:
a memory that stores an executable program; and
a processor that executes the executable program, wherein the processor is programmed to:
select a container from a plurality of standardized containers having different shapes, which is suitable for a final assembled shape of a load to be loaded on a cargo bed of a collection and delivery vehicle;
acquire collection and delivery route information for the collection and delivery vehicle, including: a collection route and a collection location on the collection route for collecting the load, and a delivery route and a delivery destination on the delivery route for delivering the load that was collected; and
determine a loading location of the selected container in the cargo bed,
wherein at a time of determining the loading location, the loading location is set at a position on the cargo bed that is farther away from a loading port of the container as a current position of the collection and delivery vehicle becomes closer to the collection location on the collection route, and the loading location is set at a position on the cargo bed that is closer to the loading port as the current position of the collection and delivery vehicle becomes closer to the delivery destination on the delivery route.

11. A loading support system according to claim 10, wherein the processor is programmed to determine, based on the acquired collection location of the load, the loading location in the cargo bed of the container containing the load obtained at the collection location.

* * * * *